US010062192B2

(12) United States Patent
George et al.

(10) Patent No.: US 10,062,192 B2
(45) Date of Patent: *Aug. 28, 2018

(54) FAST HIGH-FIDELITY FLOOD-FILLING ON VECTOR ARTWORK

(71) Applicant: Adobe Systems Incorporated, San Jose, CA (US)

(72) Inventors: Paul George, Hillsborough, CA (US); Frank Stokes-Guinan, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,157

(22) Filed: Jun. 23, 2017

(65) Prior Publication Data

US 2017/0287181 A1    Oct. 5, 2017

Related U.S. Application Data

(60) Division of application No. 15/006,749, filed on Jan. 26, 2016, now Pat. No. 9,715,747, which is a (Continued)

(51) Int. Cl.
*G06T 11/00* (2006.01)
*G06T 11/40* (2006.01)
(Continued)

(52) U.S. Cl.
CPC ............ *G06T 11/40* (2013.01); *G06T 11/001* (2013.01); *G06T 11/203* (2013.01); *G06T 11/60* (2013.01); *G06T 2210/12* (2013.01)

(58) Field of Classification Search
None
See application file for complete search history.

(56) References Cited

U.S. PATENT DOCUMENTS 6,011,911 A * 1/2000 Ho .................. G06F 17/5081
716/112
6,031,544 A    2/2000 Yhann
(Continued)

OTHER PUBLICATIONS

Rasterisation—Wikipedia, printed from URL: http://en.wikipedia.org/wiki/Rasterisation on Feb. 15, 2013, 7 pages.
(Continued)

*Primary Examiner* — Michelle M Entezari
(74) *Attorney, Agent, or Firm* — Finch & Maloney PLLC

(57) ABSTRACT

Techniques are disclosed for performing flood-fill operations on vector artwork. In one embodiment, a region under a point of interest (POI) of vector artwork is rasterized and flood-filled, and an initial bounding shape around that area is used as a first guess as to the area to be filled. In other cases, the initial bounding shape is created around some initial area that includes the POI (no rasterization). In any such case, vector objects having bounding shapes that intersect the initial bounding shape are identified and fed into a planar map. After map planarization, a new bounding shape is created around a new area resulting from the planarizing and that includes the POI. In response to that bounding shape not extending beyond the initial bounding shape, a vector-based flood-fill operation can be performed on that new area. The process repeats if a new bounding shape extends beyond previous bounding shape.

20 Claims, 13 Drawing Sheets

Related U.S. Application Data continuation of application No. 13/868,737, filed on Apr. 23, 2013, now Pat. No. 9,256,972.

(51) Int. Cl.
  *G06T 11/60* (2006.01)
  *G06T 11/20* (2006.01)

(56) References Cited

U.S. PATENT DOCUMENTS

| | | | |
|---|---|---|---|
| 6,859,553 B1 * | 2/2005 | Bourdev | G06T 11/203 |
| | | | 382/173 |
| 6,894,704 B1 | 5/2005 | Bourdev | |
| 7,242,415 B1 | 7/2007 | Yhann | |
| 7,262,782 B1 * | 8/2007 | Parenteau | G06T 11/00 |
| | | | 345/629 |
| 7,359,530 B2 | 4/2008 | Wilson | |
| 7,495,675 B1 * | 2/2009 | Bourdev | G06T 11/40 |
| | | | 345/428 |
| 7,817,307 B2 * | 10/2010 | Romney | G06T 11/60 |
| | | | 358/1.18 |
| 7,825,941 B1 | 11/2010 | Bourdev | |
| 8,274,567 B2 | 9/2012 | Raghoebardajal | |
| 8,830,513 B2 * | 9/2014 | Plettinck | G06T 11/60 |
| | | | 358/1.15 |
| 9,256,972 B2 * | 2/2016 | George | G06T 11/40 |
| 2003/0011623 A1 | 1/2003 | Dermer | |
| 2003/0193497 A1 | 10/2003 | Yhann | |
| 2005/0243346 A1 | 11/2005 | Foehr | |
| 2005/0270288 A1 | 12/2005 | Arcas | |
| 2006/0001679 A1 | 1/2006 | Hamburg | |
| 2010/0257210 A1 | 10/2010 | Witkin | |
| 2010/0309227 A1 | 12/2010 | Yokosuka | |
| 2012/0206471 A1 | 8/2012 | Sarnoff | |
| 2013/0311089 A1 | 11/2013 | Freed | |

OTHER PUBLICATIONS

Raster (Bitmap) vs Vector, Vector-Conversions.com, printed from URL: http://vector-conversions.com/vectorizing/raster_vs_vector.html on Mar. 13, 2013, 6 pages.

Vector graphics—Wikipedia, printed from URL: http:en.wikipedia.org/wiki/Vetor_graphics on Mar. 13, 2013, 7 pages.

* cited by examiner

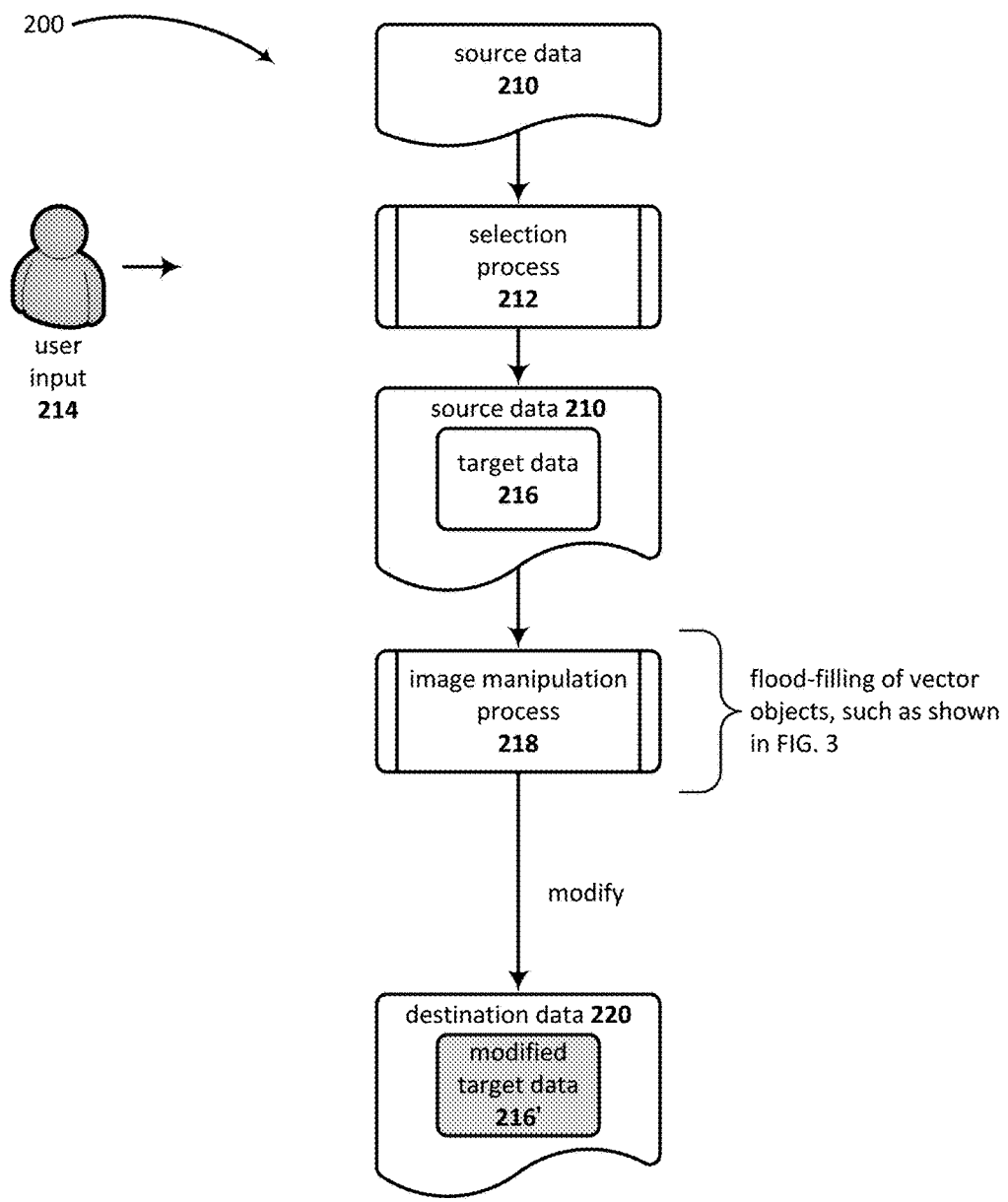

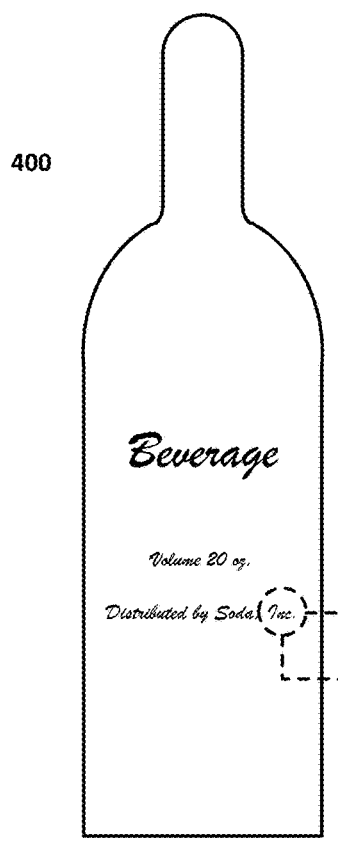
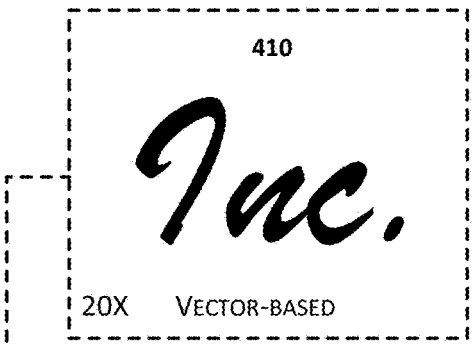
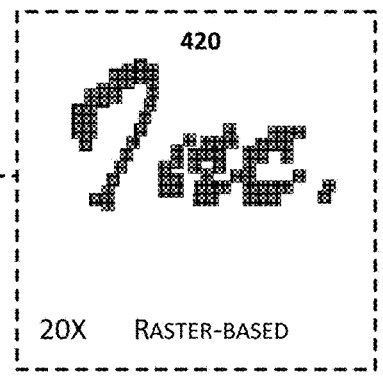
FIG. 4A
FIG. 4B
FIG. 4C

FAST HIGH-FIDELITY FLOOD-FILLING ON VECTOR ARTWORK

CROSS-REFERENCE TO RELATED APPLICATIONS

This application is a divisional of U.S. patent application Ser. No. 15/006,749 (filed 26 Jan. 2016), which is a continuation of U.S. patent application Ser. No. 13/868,737 (filed 23 Apr. 2013). The entire disclosure of both of these priority applications is hereby incorporated by reference herein.

FIELD OF THE DISCLOSURE

This disclosure relates generally to digital vector graphics processing, and more specifically to techniques for fast high-fidelity flood-filling of vector-based artwork.

BACKGROUND

A wide variety of software tools have been developed to facilitate the process of manipulating different types of digital data. For example, image editing software applications have been developed to adjust, modify and otherwise manipulate digital images. Such software applications generally allow a user to make global manipulations to an entire image as well as localized manipulations that affect only a selected portion of an image. Making localized manipulations generally comprises a two-step process of first selecting a portion of the image that is to be manipulated and then applying the desired manipulation to that selection. Manipulating digital image data can include adding texture, adjusting brightness, adjusting contrast, and flood-filling, just to name a few. There remain, however, a number of non-trivial limitations with such existing editing applications.

BRIEF DESCRIPTION OF THE DRAWINGS

FIG. 2 is a flowchart illustrating a general overview of an example vector graphics editing process configured in accordance with an embodiment of the present invention.

FIG. 4A illustrates an image of an object, FIG. 4B illustrates a magnified vector-based representation of the object in FIG. 4A in accordance with an embodiment of the present invention, and FIG. 4C illustrates a magnified raster-based representation of the object in FIG. 4A.

DETAILED DESCRIPTION

Figure 1A:
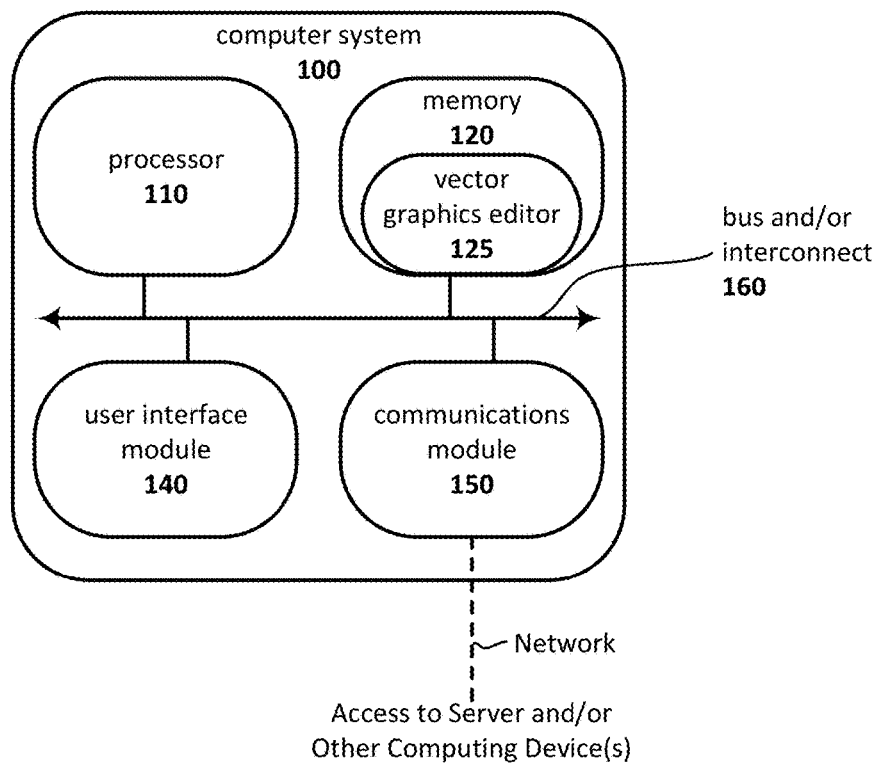
FIG. 1A is a block diagram schematically illustrating selected components of a computer system that can be used to execute a vector graphics editor configured in accordance with an embodiment of the present invention.

Techniques are disclosed for performing a fast high-fidelity flood-fill operation on a targeted portion of a vector artwork, such as an image or photo or other digital vector-based content. The techniques can be implemented on any computing system but are particularly suitable for resource-constrained devices such as mobile devices such as smart phones, tablets, and laptops. In one embodiment, a region under a point of interest, or a targeted portion of a digital artwork, is rasterized and flood-filled at a suitable resolution. The resulting region is then used to create an original bounding box (any bounding shape), which is used as a first guess as to the size of the area to be flood-filled. In other embodiments, any suitable initial guess can be used, such as an arbitrary sized rectangle or other suitable shape containing the input point, or the bounds of the particular shape containing the input point. In any such cases, an original or initial bounding shape is provided, which may generally be referred to as a bounding box herein. Once the original bounding box is created, any vector object whose bounding box intersects the original bounding box is fed into a first planar map. After the first map is planarized, a new bounding box is created that includes an updated area of interest based on the intersections, and that new bounding box is compared to the original bounding box. If the new bounding box extends beyond the original bounding box, the cycle repeats. In particular, any vector object whose bounding box intersects the new bounding box is fed into a second planar map. After the second map is planarized, a new bounding box is created that includes an updated area of interest based on the intersections, and that new bounding box is compared to the previous bounding box. The process can be repeated, for instance, until the new bounding box no longer extends beyond the previous bounding box. This provides accurate area detection and flood-filling for use in complex artwork with increased speed and lower memory requirements for the device. Numerous configurations and variations of such techniques will be apparent in light of this disclosure.

General Overview

As previously indicated, image editing software applications are often used to adjust, modify and otherwise manipulate digital images. One example of such an application is Adobe® Illustrator®, developed by Adobe Systems Incorporated of San Jose, Calif. Software such as this allows users to make localized adjustments, or otherwise manipulate, to a selected portion of an image, copy selected portions of an image, or extract selected portions of an image. These operations can be useful, for example, if a user wishes to adjust the brightness of a person's face or change the color hue of a portion of a flower without altering the remainder of the image. A wide variety of other image processing operations can be used as well. Such localized operations typically involve first making a selection which defines that portion of the image that is to be adjusted, copied or extracted. After the selection is defined, the desired operation is then applied to the portion of the image within the selected area. One type of digital image manipulation operation is a flood-fill operation performed on artwork. A vector-based flood-fill operation can be time consuming and expensive due to the way the numerous vectors are represented and rendered on-screen. In contrast, in bitmap-based or raster-based representations, flood-fill operations are more straightforward. There, a point of interest is selected and the adjacent pixels are scanned to see if they match the selected pixel color value (within some tolerance). If they do match, they are marked to change along with the pixel associated with the point of interest. With vector-based representations, true flood-fill operations need to "planarize" or "flatten" the artwork, find the region underneath the point of interest, and fill in that region. Such planarization can quickly become computationally-expensive for simple to moderately complex artwork, since the running time of planar map algorithms grow with the number of intersections between different objects.

Thus, in accordance with one embodiment of the claimed invention, techniques are disclosed for performing a fast high-fidelity flood-fill operation on a targeted portion of a digital vector-based artwork. In some cases, the amount of time spent in the planarizing step is reduced by applying techniques and heuristics discussed herein for reducing the number of vector objects fed into the planar map. This allows for better performance for flood-fill operations on complex vector artwork. To this end, the techniques can be implemented on any computing system but are particularly suitable for resource-constrained devices such as mobile devices such as smart phones, tablets, and laptops, and make it possible to run flood-fill operations on such devices such, as the operations typically requires less memory and less computation thereby using less power.

In one embodiment, a region under a point of interest, or a targeted portion of a digital artwork, is rasterized. Next, the region under the point of interest is subjected to a raster-based flood-fill operation. The resulting region is then used to create an original bounding box, which is used as a first guess as to the size of the area to be flood-filled using the techniques described herein. In practice, such a raster flood-fill process (at a suitable resolution) is generally an efficient way of providing a good initial guess. However, in other embodiments, such an initial raster flood-fill process is not used. For instance, any suitable initial guess can be used, such as an arbitrary sized rectangle containing the point of interest or the bounds of the shape containing the point of interest. Once an original bounding box (any suitable bounding shape and not necessarily rectangular or square) is created, any vector object whose bounding box intersects the original bounding box is fed into a planar map. After the map is planarized, a new bounding box is created based on an updated area of interest which includes the shape that includes the original point of interest. The updated bounding box is then is compared to the original bounding box. If the updated bounding box is larger than the original bounding box, the cycle repeats. In particular, any vector object whose bounding box intersects the current bounding box is fed into another planar map. That map is then planarized and a new bounding box is created based on an updated area of interest that includes the shape that includes the original point of interest. The new bounding box is then compared to the previous bounding box. The process can be repeated, for instance, until the new bounding box fails to extend beyond the previous bounding box, in accordance with some embodiments. This provides accurate area detection and flood-filling for use in complex artwork with increased speed and lower memory requirements for the device. Numerous configurations and variations of such techniques will be apparent in light of this disclosure.

System Architecture

FIG. 1A schematically illustrates selected components of a computer system 100 that can be used to execute a vector graphics editor configured for flood-fill in accordance with an embodiment. The computer system 100 may comprise, for example, one or more devices selected from a desktop or laptop computer, a workstation, a tablet, a smartphone, a set-top box or any other such computing device. A combination of different devices may be used in certain embodiments. The computer system 100 of this example embodiment includes, among other things, a processor 110, a memory 120, a user interface module 140 and a communications module 150. As can be further seen, a bus and/or interconnect 160 is also provided to allow for intra-device/module communications. Other componentry and functionality not reflected in the schematic block diagram of FIG. 1A will be apparent in light of this disclosure, and it will be appreciated that the claimed invention is not intended to be limited to any particular hardware configuration.

The processor 110 can be any suitable processor, and may include one or more coprocessors or controllers, such as a graphics processor, to assist in control of the computer system 100. The processor 110 may further include on-board cache to reduce need for accessing external memory, for example, when executing a given application or carrying out a given process. The memory 120 can be implemented using any suitable type(s) and size(s) of digital storage, such as one or more of a disk drive, a universal serial bus (USB) drive, flash memory and/or random access memory, or any other suitable non-volatile and/or volatile memory technologies. The memory 120 can be used, for example, for processor 110 workspace and/or executable file storage as well as for storing content and user files. In this example case, memory 120 includes a vector graphics editor 125 that can be accessed and executed by the processor 110.

The vector graphics editor 125 can be any digital editing application, such as one for creating and/or editing digital artwork such as images, photos, video and/or other such digital content. In addition to any typical functionality, the vector graphics editor is programmed or otherwise configured with flood-fill capability as described herein. In one specific such example embodiment, the vector graphics editor 125 can be configured to provide functionality such as that provided by Adobe® Illustrator® or Adobe® Photoshop®, but any comparable or competitive or other vector-based graphics editor can be configured to execute flood-fill in accordance with an embodiment of the present disclosure. In some embodiments, the vector graphics editor 125 may be configured to perform only flood-fill as variously described herein. Numerous variations and configurations will be apparent in light of this disclosure. In the example case shown in FIG. 1A, the vector graphics editor 125 is installed local to the computer system 100. In other embodiments, the computer system 100 may be implemented in a client-server arrangement such as the example embodiment shown in FIG. 1B wherein at least some portions of the vector graphics editor 125 are provided to client computing system 100 using an applet (for example, a JavaScript applet that is executable within a browser application of the computing system 100) or other downloadable module that can be provisioned in real-time in response to a request from the client computing system 100 for access to a given server 155 having resources that are of interest to the user of the client computing system 100 (for example, a cloud-based repository of images and/or other content to be edited by the user). The server 155, if applicable, can be implemented as a web-based application server or with any other suitable server technology, and may be local to the network or remotely coupled to the network by one or more other networks and/or communication channels.

Figure 1B:
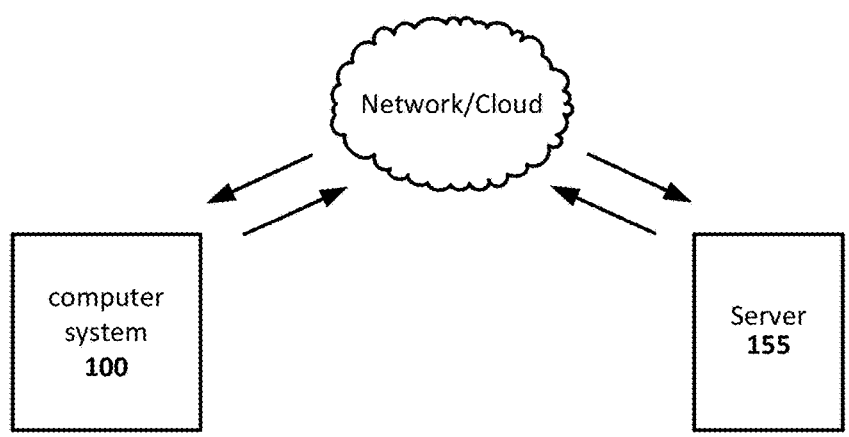
FIG. 1B is a block diagram of a network computing system that can be used to execute a vector graphics editor configured in accordance with an embodiment of the present invention

The communications module 150 can be any suitable network chip or chip set which allows for wired and/or wireless connection to a network so that the computer system 100 can communicate with other local and/or remote computing systems and/or servers, such as shown in FIG. 1B. The network may be a local area network (for example, a home-based or office network) or a wide area network (for example, the Internet) or a combination of such networks, whether private or public or both. In some cases, access to computing resources on a given network or so-called cloud-based service may require credentials such as usernames and passwords, or any other suitable security mechanisms. Other embodiments of computer system 100 may not be coupled to any network and may just operate as a stand-alone computing system, if so desired.

The user interface module 140 is configured to provide information to, and to receive information and commands from, a user of the computer system 100; it can be implemented with or otherwise used in conjunction with a variety of suitable input/output devices such as a display, a touch-screen, a speaker, a keyboard, a stylus, a touchpad, a mouse and/or a microphone. The user interface module 140 may be installed local to the computer system 100, as shown in the example embodiment of FIG. 1A. Alternatively, the computer system 100 may be implemented in a client-server arrangement such as the example embodiments shown in FIG. 1B wherein at least some portions of the user interface module 140 may be provided to client computing system 100 using an applet (for example, a JavaScript applet that is executable within a browser application of the computing system 100) or other downloadable module that can be provisioned in real-time in response to a request from the client computing system 100 for access to a given server 155 having resources that are of interest to the user of the client computing system 100 (for example, a cloud-based repository of images and/or other content to be edited by the user). As previously explained, the server 155 may be local to the network or remotely coupled to the network by one or more other networks and/or communication channels. In any such stand-alone or networked computing scenarios, the user interface module 140 may be implemented with any suitable technologies that allow a user to interact with the computing system, so that functionality of computing resources such as the vector graphics editor 125 can be used as desired by that user.

Figure 1C:
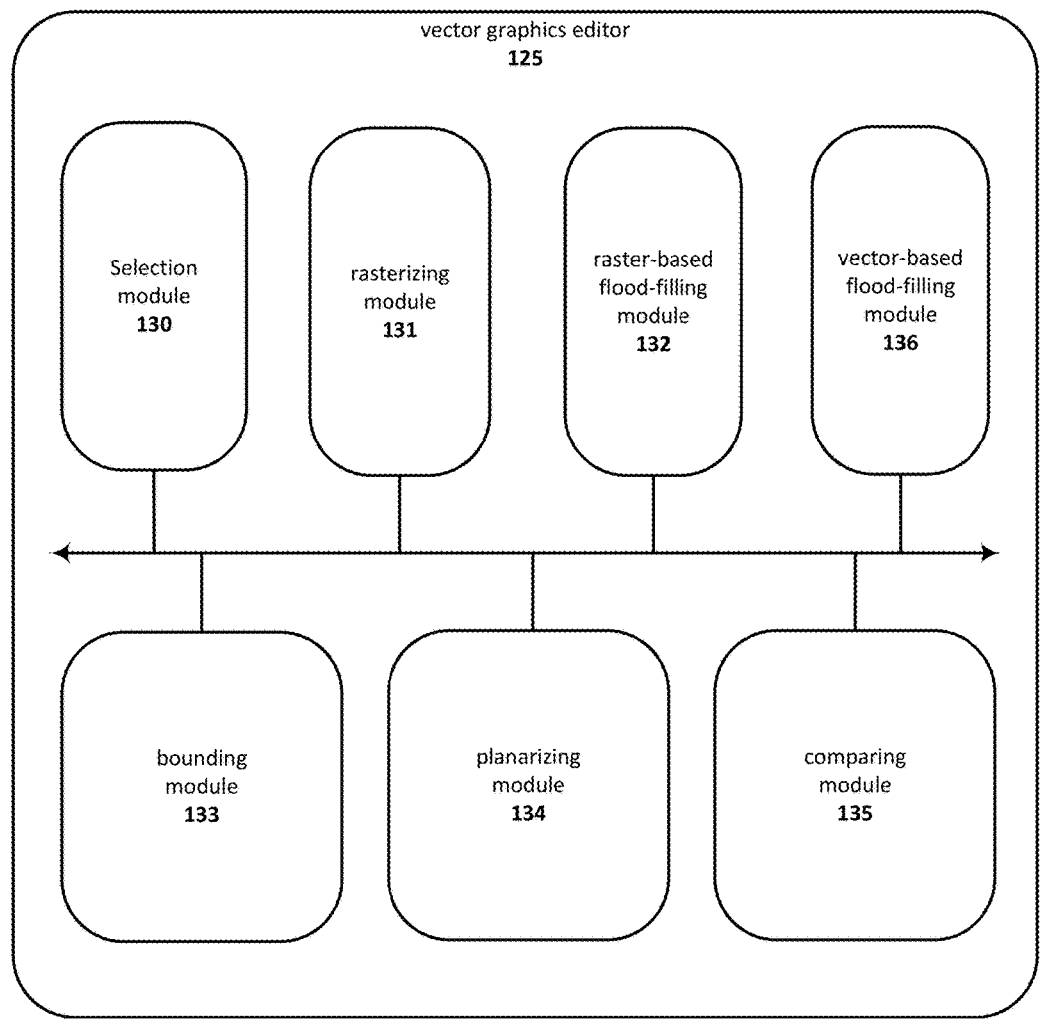
FIG. 1C is a block diagram of a vector graphics editor configured in accordance with an embodiment of the present invention.

FIG. 1C is a block diagram of a vector graphics editor 125 configured in accordance with an embodiment of the present invention. As can be seen, the vector graphics editor 125 of this example embodiment includes a selection module 130, a rasterizing module 131, a raster-based flood-filling module 132, a bounding module 133, a planarizing module 134, a comparing module 135, and a vector-based flood-filling module 136. As will be appreciated, the vector graphics editor may include other functionalities as well, and this particular example embodiment focuses on flood-filling functionality. Other embodiments may include additional or otherwise different modules. Also, the degree of modularity and functional integration may change from one embodiment to the next, as functionality of any depicted module may be incorporated into one or more other modules. This example embodiment shown is configured for purposes of facilitating discussion and understanding. Numerous other configurations will be apparent in light of this disclosure.

As will be further appreciated in light of this disclosure, the various components and modules of the vector graphics editor 125, as well as other functional modules such as those of the user interface module 140, can be implemented in software, such as a set of instructions encoded on a suitable computer readable medium that, when executed by one or more processors, cause the various methodologies provided herein to be carried out. The instructions may be implemented with any suitable programming language, such as C, C++, object-oriented C, JavaScript or BASIC, or alternatively, using custom or proprietary instruction sets. The computer-readable medium may be a non-transient storage medium suitable for storing digital information, such as a hard drive, a server, flash memory and/or random access memory. In alternative embodiments, the components and/or modules can be implemented with hardware such as gate level logic (for example, field-programmable gate array) or other purpose-built semiconductor (for example, application-specific integrated circuit). Still other embodiments may be implemented with a microcontroller having a number of input/output ports for receiving and outputting data, and a number of embedded routines for carrying out the functionality described herein. In a more general sense, any suitable combination of hardware, software and/or firmware can be used.

The selection module 130 can be programmed or otherwise configured to allow a user to select a point or area of interest in a displayed artwork that the user wishes to edit or otherwise manipulate, in accordance with some embodiments. In some cases, for instance, the user may select a given object to be filled by clicking on it, via mouse or trackpad based cursor movement and click. In other cases, the user may use an area selection tool, such as a marquee or lasso type tool that can select a particular desired area to be filled or that includes an area to be filled. Any number of suitable selection techniques and tools can be used to select a point or area of interest, as will be appreciated in light of this disclosure and the disclosure is not intended to be limited to any particular such techniques and tools.

The rasterizing module 131 can be configured to rasterize a portion of a given vector-based artwork, in accordance with an embodiment. In one particular example case, the rasterizing module 131 is configured to rasterize an area around the point of interest, based on a user selection or some other indication with respect to the area or point of interest. Such an operation can be implemented using any known or proprietary rasterization techniques. The raster-based flood-fill module 132 is configured to perform a raster-based flood-fill operation on the rasterized area of interest produced by the rasterizing module 131. In a more general sense, the raster-based flood-fill module 132 can be configured to receive a bitmap/raster representation of the area of interest, and to run a raster-based flood-fill operation thereon. Such a raster-based flood-fill operation can be implemented using any number of known or proprietary raster-based flood-fill techniques.

The bounding module 133 is configured to determine the bounds of, or bounding box for various regions (such as the one including a point of interest as indicated by the selection module 130) and/or vector objects in the artwork. In certain example embodiments, the bounding module 133 is configured to determine the bounding box for raster-based flood-fill regions produced by the raster-based flood-fill module 132, and to determine the bounding box for vector objects that intersect with that bounding box. Again, the bounding boxes may be any suitable shape and need not be limited to rectangular boxes. The planarizing module 134 is configured to detect any vector object whose bounding box intersects the bounding box produced by the bounding module 133 (over the area of interest), and to generate a planar map based on detected intersections. In particular, at least some of the artwork of the planar map is segmented into smaller shapes at dividing lines that provided by an upper shape that completely cross an underlying shape. This selective dividing process effectively removes overlap where appropriate so as to effectively place all resulting shapes into the same planar surface and thereby eliminating the need for a stacking order.

The comparing module 135 is configured to compare bounding boxes, and more specifically to compare a current bounding box of the region under the point of interest to the original or otherwise previous bounding box, so as to determine if the current bounding box extends past the bounds of the previous bounding box, in accordance with an example embodiment. If not, then the resulting shape as defined by the current bounding box can be filled with the desired color, by operation of the vector-based flood-filling module 136. On the other hand, if the current bounding box does extend past the bounds of the previous bounding box, then the process repeats until the bounding box does not extend past the bounds of the previous bounding box. The a vector-based flood-fill operation carried out by module 136 can be implemented using any number of known or proprietary vector-based flood-fill techniques, as will be appreciated in light of this disclosure.

FIG. 2 is a flowchart illustrating a general overview of an example vector graphics editing process configured in accordance with an embodiment of the present invention. As can be seen in this example case, source data 210 is provided as input to a selection process 212. The source data 210 may be, for example a digital photograph of a red rock crab on a beach. The selection process 212, which in this example embodiment may at least partially depend on user input 214, defines a selection mask that identifies a subset of target data 216 within source data 210. For example, in the aforementioned photograph of the rock crab, the target data 216 may comprise only that portion of the image which forms the rock crab's eyes. An image manipulation process 218 can then be performed with respect to the source data 210, and more specifically, with respect to target data 216.

In one embodiment, the image manipulation process 218 results in the generation of destination data 220, in which the specific effects of the image manipulation process 218 are localized to modified target data 216'. Such specific effects may include, for example, a brightness adjustment, a contrast adjustment and/or a color hue adjustment of the aforementioned rock crab. In one particular example embodiment, the image manipulation process 218 results in a vector-based flood-fill of a portion of the red rock crab's eyes, denoted as modified target data 216'. Additional details of an example flood-fill process that may reflect such an image manipulation process 218 that yields the modified target data 216' will be discussed with reference to FIGS. 3 through 8G.

The various embodiments disclosed herein can be implemented in various forms of hardware, software, firmware and/or special purpose processors. For example, in one embodiment a non-transient computer readable medium has instructions encoded thereon that, when executed by one or more processors, cause one or more of the various vector-based flood-fill operations disclosed herein to be implemented. Such a computer readable medium can be provided in the form of a computer software application or computer program product that is tangibly embodied on one or more memory devices, and that can be executed by a computer having any suitable architecture. In certain embodiments the computer program product is specifically designed for the manipulation of digital images, although in other embodiments the functionalities disclosed herein can be incorporated into other software applications, such as video editing applications, audio processing applications or document processing applications. The computer program product may include a number of different modules, sub-modules or other components of distinct functionality that can provide information to, or receive information from, other components. These modules can be used, for example, to communicate with input and output devices such as pointing devices, display screens and/or other user interface devices. For instance, certain embodiments include a user interface module that further comprises a display module configured to display a source image, and a selection module configured to display a movable cursor, and the like, over the source image for use in selecting the region of the image to be manipulated.

Methodology

Figure 3:
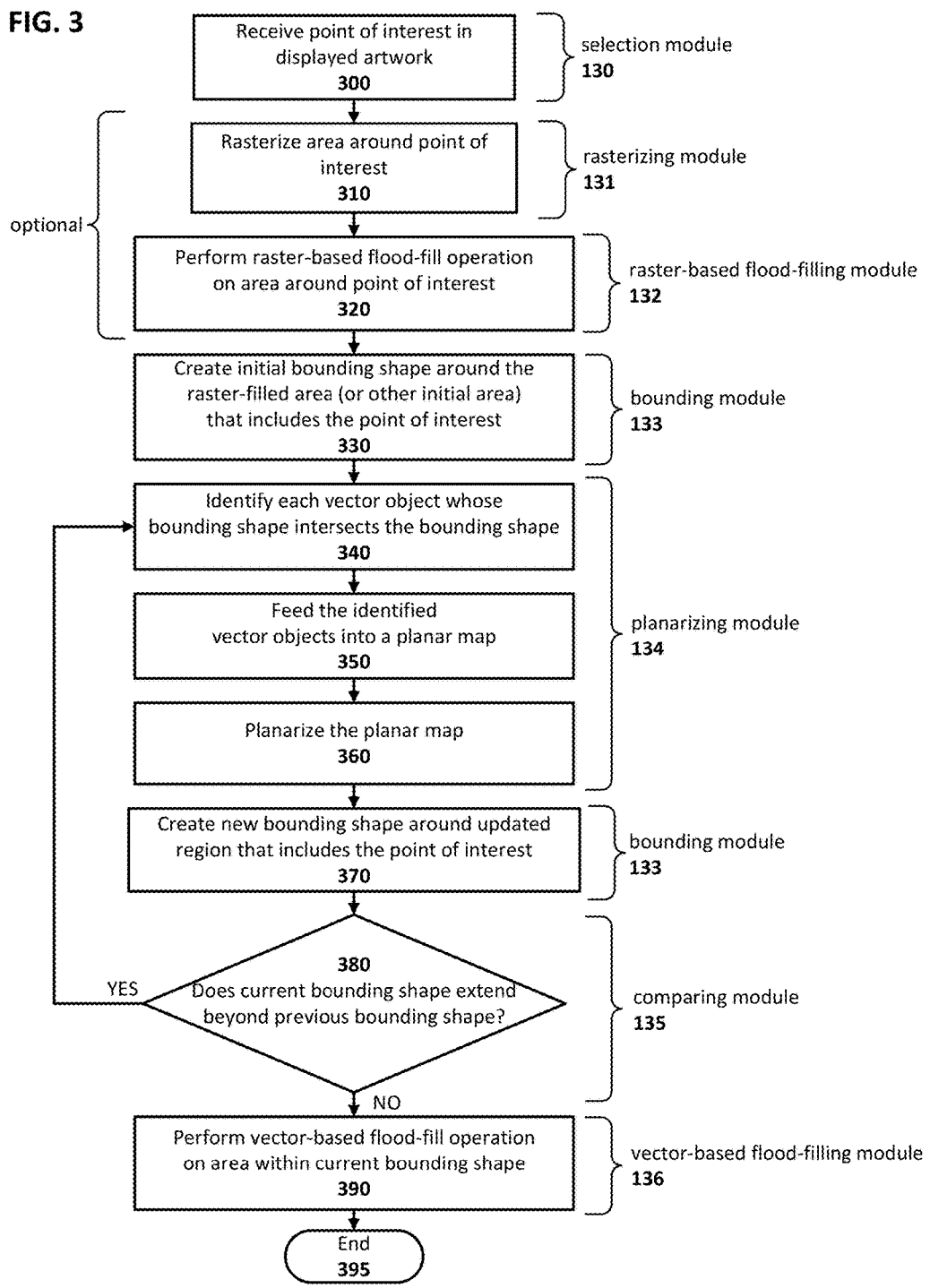
FIG. 3 is a flowchart illustrating example techniques for manipulating digital graphics data, including flood-filling operations in accordance with an embodiment of the present invention.

FIG. 3 is a flowchart illustrating a flood-filling operation configured in accordance with an embodiment of the present invention. As can be seen, each of the functions of the methodology can be attributed to a given module shown in FIG. 1C, in accordance with one such embodiment. As previously explained, the functions may be implemented in software, hardware, firmware, or any combination thereof. Numerous variations will be apparent in light of this disclosure.

The methodology begins with receiving 300 a point of interest in a displayed vector-based artwork. In some cases, a user may provide the point of interest, but in other embodiments the point of interest can be provided, for example, automatically by a computer program configured to identify areas in a given graphic that are suitable candidates for flood-fill. Once a point of interest has been received, the method may continue in a number of ways. In one embodiment shown, the method optionally continues with rasterizing 310 an area around the point of interest. Rasterization is the process of converting a vector-based image (for example, comprised of lines, curves, shapes) into a raster image (for example, comprised of pixels), so that the image can be displayed, printed, stored in a bitmap file format, and the like. Compared to other rendering techniques such as ray tracing and ray casting, rasterization is very fast. Rasterization can also be used to manipulate a 3D scene, made up of a series of polygons, and render it onto a 2D surface, such as a display, a touchscreen, and the like. In a vector-based image, polygons are represented as a collection of triangles, for example, which are represented by three vertices in 3D space. Rasterization then takes that series of vertices and transforms them into corresponding 2D points via the display module so the 2D triangles can be filled in as desired. Some image editing software applications retain the vector-based nature of images, thus preserving their quality and detail at increased magnification. However, editing vector-based images can be both time consuming and computationally expensive. Still referring to FIG. 3, once the area around the point of interest has been rasterized at 310, the method optionally continues with performing 320 a raster-based flood-fill operation on the rasterized area around the point of interest. Once the region has been flood-filled, the method continues with creating 330 an initial bounding shape around the raster-filled area that includes the point of interest as a first guess as to the size of the area to be vector-based flood-filled. Thus, the optional initial raster flood-fill process can be used to provide an initial guess for the bounding shape. However, any suitable initial guess can be used. For example, other embodiments may just include creating 330 an initial bounding shape around some initial area that includes the point of interest as a first guess as to the size of the area to be vector-based flood-filled, effectively eliminating 310 and 320. This initial area may be, for example, an arbitrary sized rectangle containing the point of interest, or based on the bounds of the shape containing the point of interest. As will be further appreciated in light of this disclosure, any suitable bounding shape or shapes can be used in accordance with an embodiment of the present invention. To this end, rectangular bounding boxes are particularly convenient because they are relatively easy to compute and work with, but there are many other suitable alternatives including bounding circles, non-axis aligned bounding boxes, convex hulls, or the exact bounding shape of the current flood-fill region (to name a few) that can be used to filter out vector objects in a next iteration, as variously described herein. For purposes of simplicity, the present disclosure refers to bounding box or bounding shape interchangeably, as will be appreciated.

The method continues with identifying 340 any vector object that has a bounding box or shape that intersects with the initial bounding shape, and feeding 350 those identified vector objects into a planar map. The method continues with planarizing 360 the planar map. In particular, the map is segmented into shapes that do not overlap so as to effectively place all shapes affected by the intersecting into the same planar surface. In some embodiments, adjacent shapes can be merged when appropriate. In more detail, after planarization has reduced the vector shapes to a set of non-intersecting shapes, the process may further include identifying a subset of those shapes that represent the result of the vector fill. The subset can be determined, for example, by transitively merging shapes adjacent to the shape containing the original point of interest. The shapes can be merged, for example, if they satisfy some criteria, such as having the same color or texturing.

Once the map is planarized, the method continues with creating 370 a new or otherwise updated bounding box/shape around the updated region or resulting shape (based on the planarization) that includes the original point of interest. The method continues with determining 380 if the new bounding box/shape extends beyond the preceding bounding box/shape. If so, then the process repeats from 340 to 380, as shown in FIG. 3. Thus, vector objects whose bounding boxes/shapes intersect the preceding bounding box/shape at 340 are then fed into a new or otherwise updated planar map at 350. The map is planarized at 360 and a new or otherwise updated bounding box/shape is once again created at 370 and compared to the preceding bounding box/shape at 380. The process repeats until the current bounding box/shape does not extend beyond the previous bounding box/shape. If the determination at 380 indicates that the new bounding box/shape extends beyond the preceding bounding box/shape, then the method continues with performing 390 vector-based flood-filling of the area identified by the current bounding box/shape. Note that each iteration need not necessarily employ a "new" planar map per se. Rather, the previous planar map can be incrementally updated if such incremental updating is supported. In any case, reference to a "new" planar map as used herein is intended to include an actual new map or an incrementally updated map, as will be appreciated in light of this disclosure.

In one embodiment of the present invention, the methodology at 340 through 380 repeats somewhere between 1 to 4 times in most complex vector-based artwork. Even though multiple planar maps may be generated and run, this technique is still faster than attempting to execute one planar map incorporating the entire vector-based artwork. The methodology provides the same region as would have been provided had the entire artwork been fed into a planar map, thus preserving the accuracy of slower and more computation-intensive processes. In one example of an embodiment of the present invention, the flood-fill operation was reduced from 10 minutes down to 10 seconds on a tablet with an extremely complex piece of vector-based artwork. In contrast, creating one planar map of the entire vector-based artwork caused the device to crash due to insufficient memory.

A number of variations on the methodology will be apparent in light of this disclosure. For example, and in accordance with another embodiment, another suitable representation for the bounding shape information is a regular grid of cells that are placed over the artwork. In this representation, a grid cell could be marked as "empty" unless it contains a part of the area currently known to be included in the flood-fill result. Thus, and in accordance with one such embodiment, only the grid cells corresponding to an initial raster flood-fill would be marked ("not empty"). With this approach and an incremental planar map implementation, the planarizing would only have to planarize the objects that intersect grid cells that have not been previously marked. This particular example approach can be thought of as an incremental planar map construction that happens to be supported by an appropriate choice of bounding shape representation.

FIG. 4A illustrates an image of an example artwork. The object 400 is a bottle with a label containing various size fonts denoting certain details about the bottled beverage. In FIG. 4B, a vector-based representation 410 of a portion of the object 400 in FIG. 4A is shown. The portion has been magnified about 20 times. In FIG. 4C, a raster-based representation 420 of a portion of the object 400 in FIG. 4A is shown. The portion has been magnified about 20 times. As can be seen in FIG. 4B, vector-based images 410 are resolution independent and retain the fine details of the object at increased magnification. In contrast, as can be seen in FIG. 4C, raster-based images 420 are resolution dependent. In other words, as the magnification of the image increases, the pixilation of the raster-based image becomes apparent and the fine detail is lost. Because there is less detail in a raster-based image, manipulation of the image requires less computation and can be done quickly.

Figure 5A:
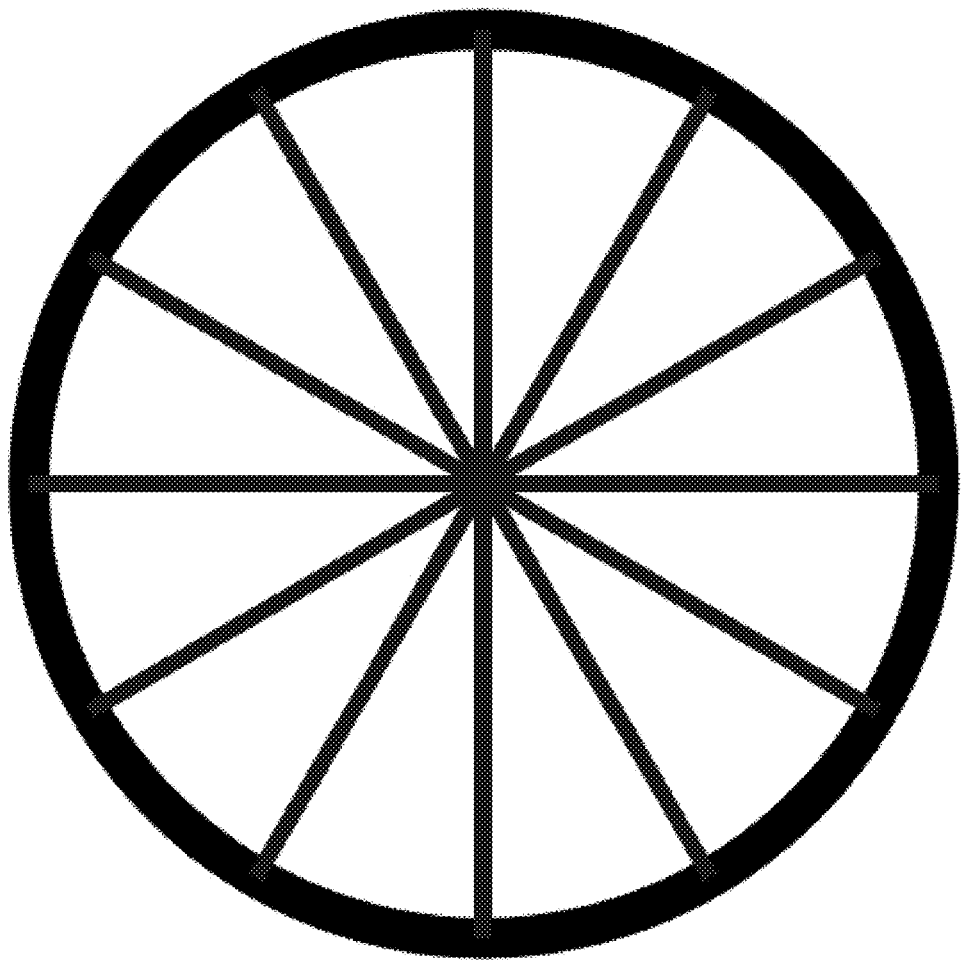
FIG. 5A illustrates another magnified vector-based object.
Figure 5B:
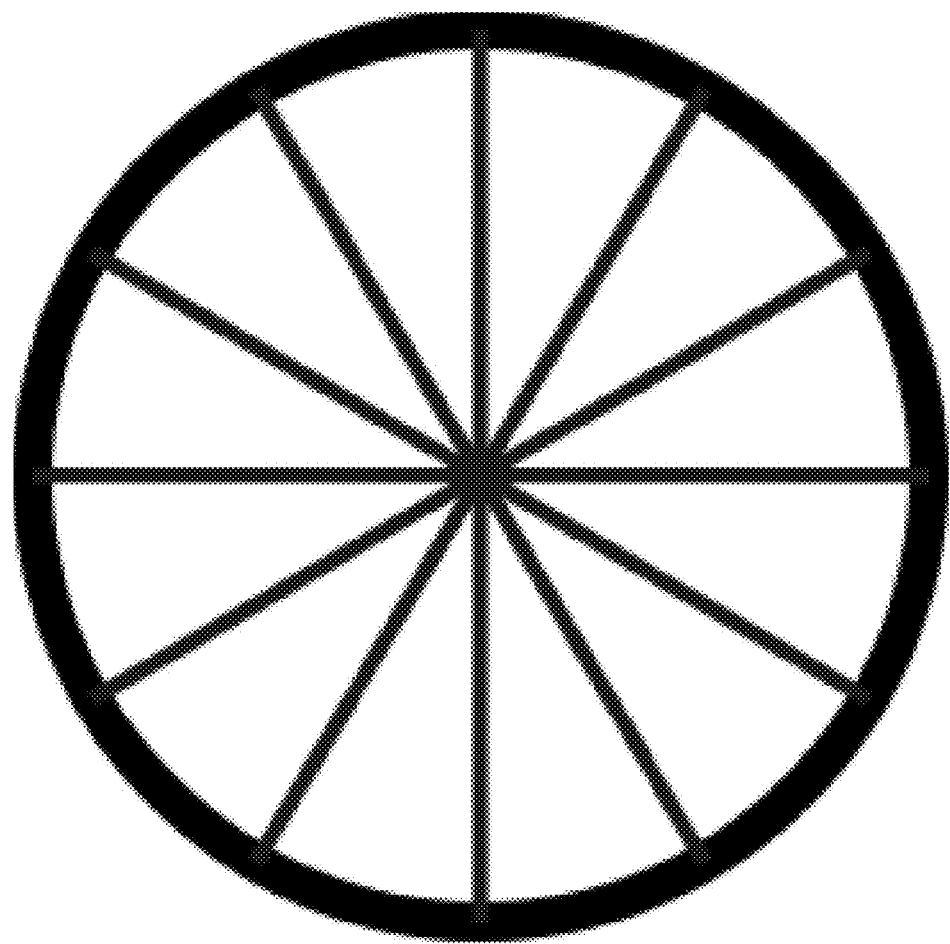
FIG. 5B illustrates a magnified raster-based object.

FIG. 5A illustrates another example magnified vector-based object. The object has been zoomed in at 200% and retains the same detail and smooth contours as the smaller object. As can be appreciated, there are many advantages to using and manipulating vector-based images. Vector-based images are comprised of mathematical calculations that form objects and lines. For example, a circle is often stored as a center point, a radius, and information regarding the line and fill properties of the object. This allows vector-based image files to remain small and scalable. Vector-based images are therefore resolution independent. Vector-based images can also be converted to raster-based images for printing, and the like. Raster-based images, on the other hand, are comprised of pixels, which are tiny dots or squares of color. FIG. 5B illustrates a raster-based object zoomed in at 200%. As shown in FIG. 5B, the circle in a raster-based image is comprised of a constrained number of pixels. A raster-based image is therefore limited by the number of pixels in the image, so it cannot be scaled without losing quality. Thus, a large (dimension) and detailed raster-based image requires a large file size. Depending on the image, conversion to a vector-based image may also be very time consuming and computationally expensive.

Example Flood-fill Operation

Figure 6A:
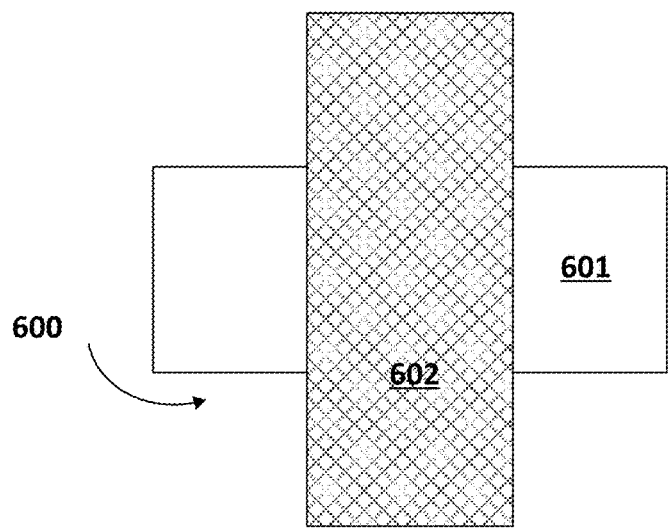
FIG. 6A illustrates two objects that can be represented as vector-based artwork in accordance with an embodiment of the present invention.
Figure 6B:
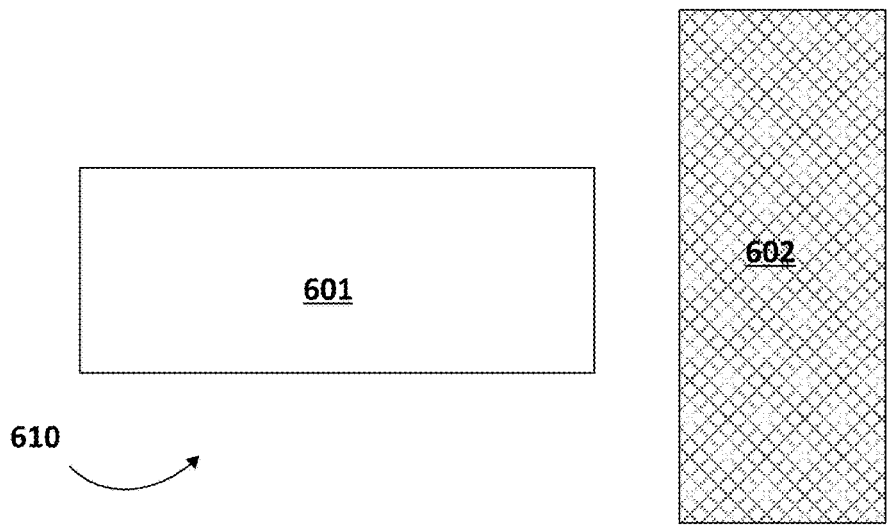
FIG. 6B illustrates the two objects in FIG. 6A in an unstacked arrangement.

FIGS. 6A, 6B and 7A through 7D illustrate vector-based artwork. In particular, FIGS. 6A and 6B illustrate how object vectors are represented. Each shape in a vector artwork can be assigned a color, and there is a defined stacking order between the shapes. In the example of FIG. 6A, the vector artwork includes two shapes, with the rectangle 602 lying on top of the rectangle 601. FIG. 6B shows the two vector-based objects in FIG. 6A in an unstacked arrangement 610. In a vector-based image, the graphical information is stored with respect to the objects themselves, not their 2D representation. In contrast to raster-based images, which are comprised of a grid of pixels, or dots, where each pixel is assigned a color; vector artwork is represented by a collection of geometric shapes and curves. Each shape or curve is assigned a color value. Where shapes overlap, there is a stacking order assigned to the shapes. For simplicity, the objects shown in the figures are comprised of simple polygons. However, typical artwork will include any number of irregular and/or geometrical shapes, wherein the vector objects may be comprised of complex curved shapes. The various flood-fill techniques provided herein can be readily applied to any such artwork, as will be appreciated in light of this disclosure. For simplicity, the horizontal rectangle 601 is shown to the left of the vertical rectangle 602 to demonstrate that in vector-based artwork, the entire object (for example, the horizontal rectangle of equal size to the vertical rectangle) is stored, not a 2D representation of it, which would be comprised of a grid of pixels. As previously explained, flood-fill operations tend to work more efficiently with raster artwork, as that involves simply assigning a color to a pixel along with any neighboring pixels with the same color value (within some tolerance). However, for vector artwork, assigning a color to a shape results in a different visual result than flood-filling.

Figure 7A:
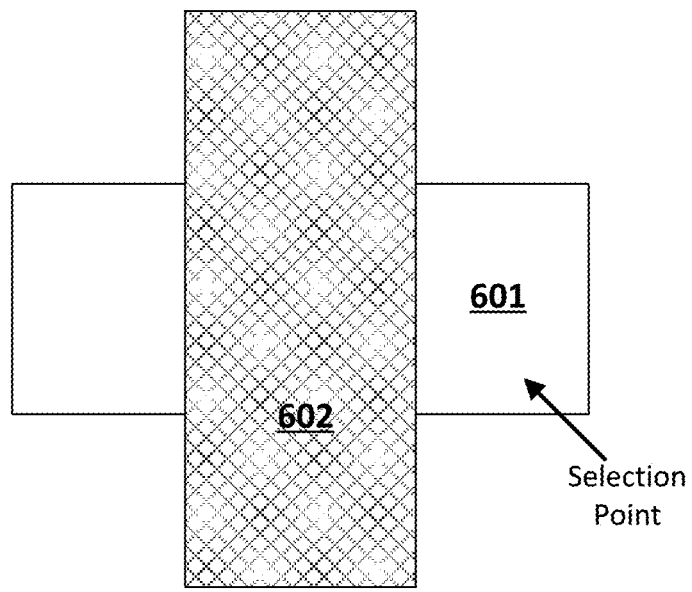
FIG. 7A through 7D collectively illustrate how assigning a color to one of the two vector-based objects using a raster-based flood-fill produces a visual effect that is different than would result with a vector-based flood-filling operation.
Figure 7B:
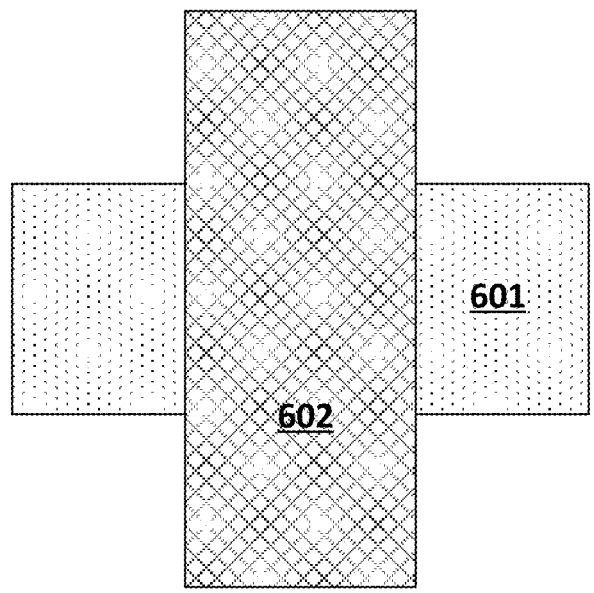

FIGS. 7A and 7B illustrate why flood-fill operations can be tricky in vector artwork. If this were a raster-based artwork, only the portion of rectangle 601 to the right of rectangle 602 (generally designated by the selection point) could be flood-filled without affecting the portion of rectangle 601 to the left of rectangle 602. This is because raster-based flood-fill operations simply change the color of the pixel you clicked on and any neighboring pixels that have the same color. For vector-based artwork, however, the color is not assigned to an individual pixel, but is instead assigned to an entire shape. So, trying to change the color of the shape that looks to be to the right of rectangle 602 ends up changing the color of the shape to the left of rectangle 602 too. This is because both parts are actually the same shape (that is, rectangle 601), and the color is assigned to the entire shape.

Figure 7C:
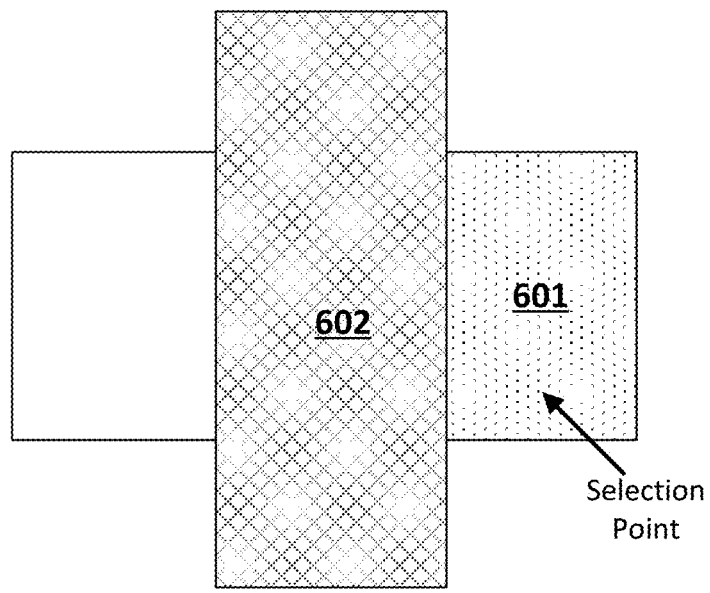
Figure 7D:
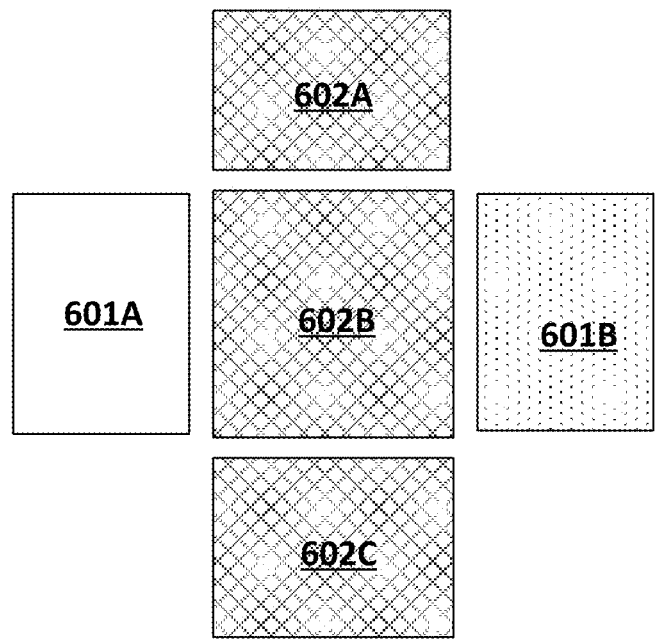

FIGS. 7C and 7D illustrate how vector-based flood-fill operations work in practice. Because colors are assigned to shapes, vector-based flood-filling requires the flood-fill process to break up the shapes 601 and 602 into individual, non-overlapping pieces. This is the process called planarizing as previously explained, wherein the resulting shapes effectively end up on the same plane. In more detail, the right side of the horizontal rectangle 601 in the vector-based artwork shown in FIG. 7C has been selected and the selection received for use with a flood-fill operation as described herein. FIG. 7D illustrates a planarized representation of the objects in FIG. 7C, where the vertical rectangle 602 is represented as three smaller shapes that are non-overlapping, including shapes 602A, 602B, and 602C. As further shown in FIG. 7D, what was the original shape 601 underneath the shape 602 is now represented as two smaller shapes 601A and 601B. Note that the resulting shapes are shown with exaggerated spacing therebetween, for purposes of illustration; in actuality, they would abut one another in the same plane as a result of planarization. Portion 601B has undergone a vector-based flood-fill operation and now has a different fill property (for example, different color, pattern, and the like) than the left-most portion 601A of the original shape 601. The stacking order between the shapes becomes irrelevant since there is no overlap between the new shapes resulting from planarization. The planarizing process can be computationally expensive, however, in moderate to complex artwork. In accordance with an embodiment of this disclosure, a flood-fill process is provided that minimizes or otherwise reduces the number of input shapes that is fed into the planarizing portion of the process. In particular, it turns out that repeating the planarizing process with minimal input (for example, some sub-set of all the shapes in the artwork) is often faster than planarizing all the shapes in the artwork, as will be appreciated in light of this disclosure.

Figure 8A:
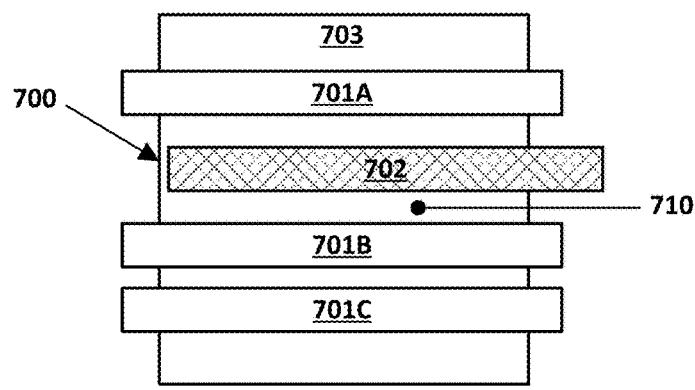
FIGS. 8A through 8G graphically illustrate a flood-fill operation in accordance with an embodiment of the present invention.
Figure 8B:
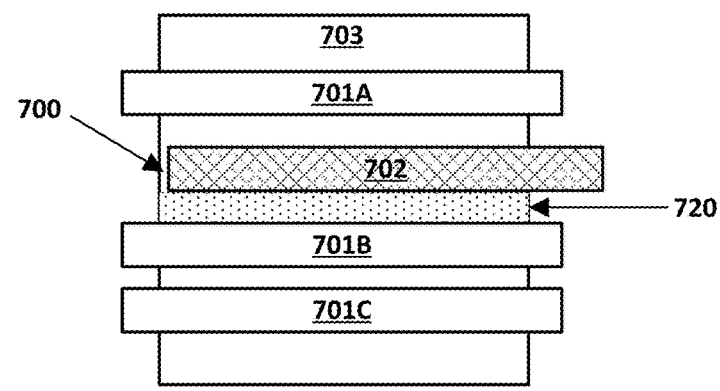

FIGS. 8A through 8G graphically illustrate a flood-fill operation in accordance with an embodiment of the present invention. In more detail, the artwork shown in FIG. 8A is made up of a square 703 in the background, and four rectangles overlaid on top of the square 703. Three rectangles 701A-C extend over both sides of the square 703, and one rectangle 702 extends over only the right side of the square 703 and leaves a small exposed gap 700 on the left side of square 703. Here, the center region 710 has been selected as a point of interest for a vector-based flood-fill operation in accordance with an embodiment of the present invention. Upon receiving that selection, the area around the point of interest is rasterized, and a raster-based flood-fill operation then run on that rasterized area. The resulting raster-based flood-filled region is generally designated with the dotted region at 720, as shown in FIG. 8B. Notice the small gap 700 between the edge of the rectangle 702 and the edge of the square 703. A raster-based flood-fill operation might treat this as anti-aliasing noise and not fill past the rectangle 702 (as shown in FIG. 8B).

Figure 8C:
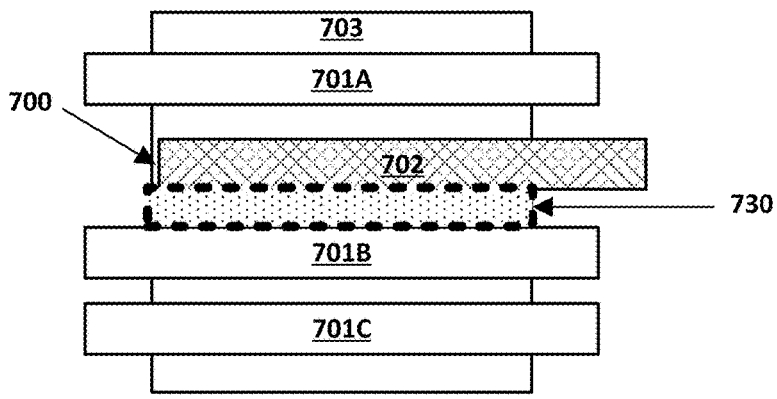

A vector-based flood-fill operation configured in accordance with an embodiment of the present invention then uses the bounding box of the raster-filled region 720 to identify the vector objects in the original vector artwork that have bounding boxes which intersect with that bounding box of the raster-filled region 720. FIG. 8C shows the bounds of the bounding box 730 (heavy dashed box) of the raster-filled region 720. As can further be seen, FIG. 8C also shows the vector objects that intersect bounding box 730, including (in order from lowest intersecting vector object to highest intersecting vector object as depicted in FIG. 8C) shape 701B, shape 702, and shape 703 (via the gap 700).

Figure 8D:
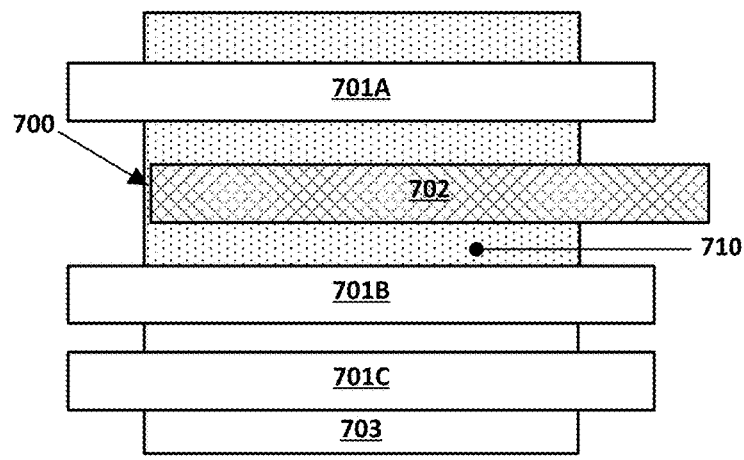

The vector shapes whose bounding boxes intersect the bounding box 730 are fed into a planar map. Once the map is planarized to remove overlapping between the intersecting vector objects, the resulting region/shape that includes or is otherwise under the point of interest is examined or otherwise identified, in accordance with an embodiment of the present invention. For instance, in this example case, each of the vector objects 701B, 702, and 703 are fed into a planar map because they intersect the bounding box 730. FIG. 8D highlights the resulting shapes after the map is planarized. As can be seen, the planarization divides the original shape 703 into two smaller shapes—the top portion highlighted with dotting and the remaining bottom portion (with no highlighting). The other original shapes 701B and 702 having bounding boxes that intersect with bounding box 730 are unaffected by the planarization (not divided into smaller portions, because they are on top). Note that the highlighted top portion of shape 703 is not divided into two pieces (one piece above object 702 and one piece below object 702), because object 702 does not completely overlap that highlighted upper portion due to gap 700 (as such, a C-shape results). Further note that objects 701A and 701C are not involved in this particular round of planarization, as they do not have bounding boxes that intersect the initial bounding box 730. As can further be seen in FIG. 8D, the original point of interest 710 is now included in the highlighted top portion of shape 703. This new C-shape can be thought of as the updated area or region of interest.

Figure 8E:
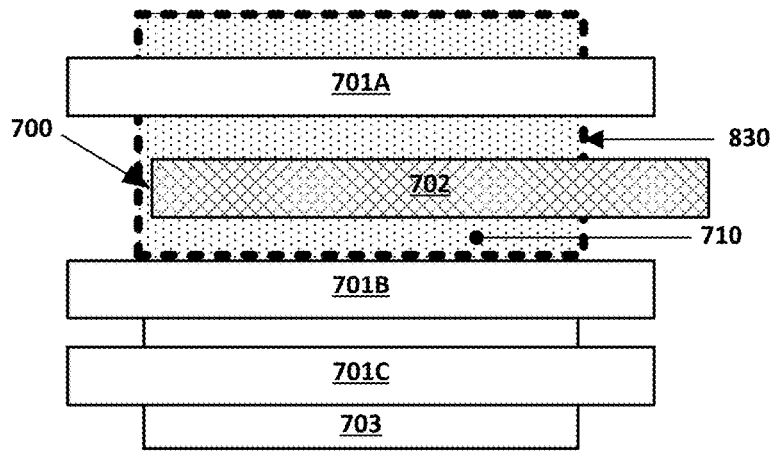
Figure 8F:
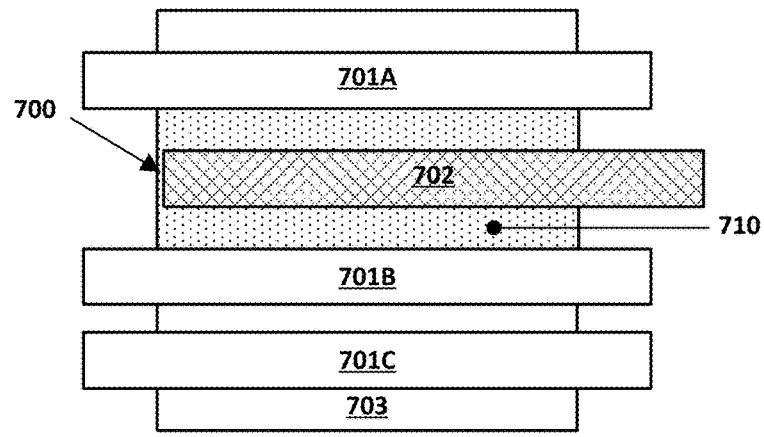
Figure 8G:
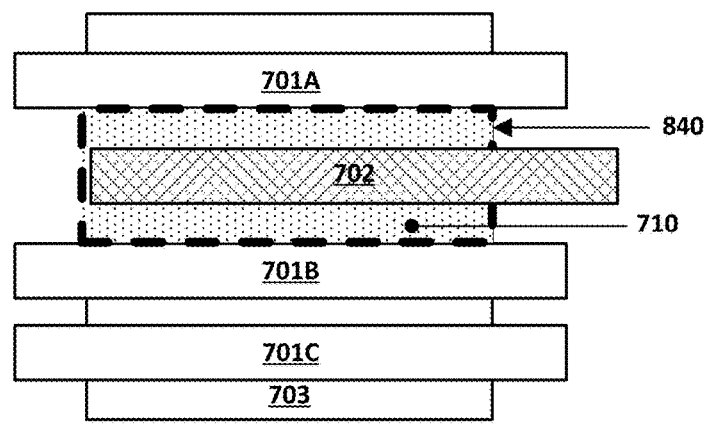

A bounding box 830 is provided about that updated area of interest, as shown in FIG. 8E, in accordance with an embodiment of the present invention. This bounding box 830 is compared against the previous bounding box 730. If the current bounding box 830 does not extend past the preceding bounding box 730, then the process stops, and the resulting new shape identified within the current bounding box 830 can be given the desired fill properties (for example, color), using a vector-based flood-fill methodology. However, if the bounding box 830 does extend past the preceding bounding box 730, then the processing may repeat, as further shown in FIGS. 8E through 8G. In particular, FIG. 8E shows the vector objects that intersect bounding box 830, including (in order from lowest intersecting vector object to highest intersecting vector object as depicted in FIG. 8E) the lower portion of shape 703 (with no highlighting), shape 701B, highlighted top portion of shape 703 (with dotting), shape 702, and shape 701A. The vector shapes whose bounding boxes intersect the bounding box 830 are fed into a planar map, which is planarized as done previously to remove overlapping between this subset of shapes, and the resulting shape that includes or is otherwise under the point of interest is once again identified. Thus, in this example case, each of the lower portion of shape 703 (with no highlighting), shape 701B, top highlighted portion of shape 703 (with dotting), shape 702, and shape 701A are fed into a planar map because they each have a bounding box that intersects the bounding box 830. FIG. 8F highlights the resulting shapes after the map is planarized. As can be seen, the planarization divides the previously highlighted top portion of shape 703 into two smaller shapes—the bottom portion now highlighted with dotting (portion between 701A and 701B) and the remaining top portion with no highlighting (portion above 701A). The other shapes 701A, 701B and 702 are unaffected by this particular round of planarization (not divided into smaller portions, as they are on top); nor is the bottom portion of 703 (below 701B and not highlighted), as shape 701C is not involved in this round of planarization because its bounding box does not intersect the bounding box 830. Again, note that the highlighted portion of shape 703 is not divided into two pieces (one piece above object 702 and one piece below object 702), because object 702 does not completely overlap that highlighted upper portion due to gap 700 (as such, a C-shape results similar to the previous C-shape discussed with reference to FIGS. 8D and 8E but with a thinner top section). As can further be seen in FIG. 8F, the original point of interest 710 is now included in the highlighted middle C-shaped portion (with dotting) of the original shape 703. A bounding box 840 is provided about that updated area of interest, as shown in FIG. 8G, in accordance with an embodiment of the present invention. This bounding box 840 is compared against the previous bounding box 830. If the bounding box 840 does not extend past the preceding bounding box 830, then the process stops, and the resulting new shape identified within the bounding box 840 (the highlighted middle C-shaped portion of 703 in this specific example case) can be given the desired fill properties (for example, color, texture, pattern, etc), using a vector-based flood-fill methodology. Otherwise, the process can repeats as necessary, until the current bounding box does not extend past the previous bounding box. The final bounded area can then be flood-filled and results in the same area as would have been found had the entire artwork been fed into a planar map.

Numerous variations and configurations will be apparent in light of this disclosure. For example, one embodiment of the present invention provides a computer-implemented method for vector-based flood-filling. The method includes creating an initial bounding shape around a point of interest in a vector-based image that includes a plurality of vector objects, and identifying which of the vector objects have bounding shapes that intersect the initial bounding shape. The method continues with feeding the identified vector objects into an initial planar map, and planarizing the initial planar map to remove overlapping. The method continues with creating a second bounding shape around a first new area resulting from the planarizing and that includes the point of interest. In response to the second bounding shape not extending beyond the initial bounding shape, the method continues with performing a vector-based flood-fill on the first new area. In some embodiments, in response to the second bounding shape extending beyond the initial bounding shape, the method further includes identifying which of the vector objects have bounding shapes that intersect the second bounding shape, feeding the identified vector objects that have bounding shapes that intersect the second bounding shape into a second planar map, planarizing the second planar map to remove overlapping, and creating a third bounding shape around a second new area resulting from the planarizing of the second planar map and that includes the point of interest. In response to the third bounding shape not extending beyond the second bounding shape, the method continues with performing a vector-based flood-fill on the second new area. In some such cases, in response to the third bounding shape extending beyond the second bounding shape, the method further includes identifying which of the vector objects have bounding shapes that intersect the third bounding shape, feeding the identified vector objects that have bounding shapes that intersect the third bounding shape into a third planar map, planarizing the third planar map to remove overlapping, and creating a fourth bounding shape around a third new area resulting from the planarizing of the third planar map and that includes the point of interest. In response to the fourth bounding shape not extending beyond the third bounding shape, the method further includes performing a vector-based flood-fill on the third new area. In some such cases, in response to the fourth bounding shape extending beyond the third bounding shape, the method further repeats identifying intersections associated with a current bounding shape, feeding a next planar map, planarizing the next planar map, and creating a new bounding shape until an Nth bounding shape does not extend beyond the (N−1)th bounding shape, at which point the process further includes performing a vector-based flood-fill on the (N−1)th new area, wherein N is an integer that is initially equal to 5 and increments by one for each repeat cycle. In some cases, the method includes receiving the point of interest in the vector-based image based on a user input, rasterizing an area around the point of interest, and performing a raster-based flood-fill on the area around the point of interest, wherein the initial bounding shape is created around the raster-based flood-filled area around the point of interest. In some cases, the vector objects that have bounding shapes that intersect the initial bounding shape are a subset of the plurality of vector objects. For purposes of clarity, a subset as used here is one or more of the plurality of vector objects but not all of the plurality of vector objects.

Another embodiment of the present invention provides a computing system for vector-based flood-filling. The system includes a bounding module configured to create an initial bounding shape around a point of interest in a vector-based image that includes a plurality of vector objects. The system further includes a planarizing module configured to identify which of the vector objects have bounding shapes that intersect the initial bounding shape, and to feed the identified vector objects into an initial planar map, and to planarize the initial planar map to remove overlapping. The bounding module is further configured to create a second bounding shape around a first new area resulting from the planarizing and that includes the point of interest. The system further includes a vector-based flood-fill module configured to, in response to the second bounding shape not extending beyond the initial bounding shape, perform a vector-based flood-fill on the first new area. In some cases, in response to the second bounding shape extending beyond the initial bounding shape: the planarizing module is further configured to identify which of the vector objects have bounding shapes that intersect the second bounding shape, and to feed the identified vector objects that have bounding shapes that intersect the second bounding shape into a second planar map, and to planarize the second planar map to remove overlapping; and the bounding module is further configured to create a third bounding shape around a second new area resulting from the planarizing of the second planar map and that includes the point of interest; and the vector-based flood-fill module is further configured to, in response to the third bounding shape not extending beyond the second bounding shape, perform a vector-based flood-fill on the second new area. In some such cases, in response to the third bounding shape extending beyond the second bounding shape: the planarizing module is further configured to identify which of the vector objects have bounding shapes that intersect the third bounding shape, and to feed the identified vector objects that have bounding shapes that intersect the third bounding shape into a third planar map, and to planarize the third planar map to remove overlapping; the bounding module is further configured to create a fourth bounding shape around a third new area resulting from the planarizing of the third planar map and that includes the point of interest; and the vector-based flood-fill module is further configured to, in response to the fourth bounding shape not extending beyond the third bounding shape, perform a vector-based flood-fill on the third new area. In some such cases, in response to the fourth bounding shape extending beyond the third bounding shape, the system is further configured to repeat the identifying and feeding and planarizing performed by the planarizing module, and the creating a new bounding shape by the bounding module until an Nth bounding shape does not extend beyond the (N−1)th bounding shape, at which point the vector-based flood-fill module is further configured to perform a vector-based flood-fill on the (N−1)th new area, wherein N is an integer that is initially equal to 5 and increments by one for each repeat cycle. In some cases, the system includes a selection module for receiving the point of interest in the vector-based image based on a user input, a rasterizing module configured to rasterize the area around a point of interest, and a raster-based flood-fill module configured to perform a raster-based flood-fill on the area around the point of interest, wherein the initial bounding shape is created around the raster-based flood-filled area around the point of interest. In some cases, the system includes a comparing module configured to determine when a given current bounding shape does not extend beyond a previous bounding shape. In some cases, the vector objects that have bounding shapes that intersect the initial bounding shape are a subset of the plurality of vector objects. In some cases, the computing system is a mobile computing device. In some cases, each of the bounding shapes is rectangular.

Another embodiment of the present invention provides a non-transitory computer program product comprising program instructions encoded on one or more computer readable mediums that when executed by one or more processors cause a vector-based flood-filling process to be carried out. The process includes creating an initial bounding shape around a point of interest in a vector-based image that includes a plurality of vector objects, and identifying which of the vector objects have bounding shapes that intersect the initial bounding shape. The process continues with feeding the identified vector objects into an initial planar map, and planarizing the initial planar map to remove overlapping. The process further includes creating a second bounding shape around a first new area resulting from the planarizing and that includes the point of interest. In response to the second bounding shape not extending beyond the initial bounding shape, the process further includes performing a vector-based flood-fill on the first new area. In response to the second bounding shape extending beyond the initial bounding shape, the process further includes: identifying which of the vector objects have bounding shapes that intersect the second bounding shape; feeding the identified vector objects that have bounding shapes that intersect the second bounding shape into a second planar map; planarizing the second planar map to remove overlapping; and creating a third bounding shape around a second new area resulting from the planarizing of the second planar map and that includes the point of interest. In response to the third bounding shape not extending beyond the second bounding shape, the process further includes performing a vector-based flood-fill on the second new area. In some cases, in response to the second bounding shape extending beyond the initial bounding shape, the process further repeats identifying intersections associated with a current bounding shape, feeding a next planar map, planarizing the next planar map, and creating a new bounding shape until an Nth bounding shape does not extend beyond the (N−1)th bounding shape, at which point the process further comprises performing a vector-based flood-fill on the (N−1)th new area, wherein N is an integer that is initially equal to 3 and increments by one for each repeat cycle. In some cases, the process includes receiving the point of interest in the vector-based image based on a user input, rasterizing an area around the point of interest, and performing a raster-based flood-fill on the area around the point of interest, wherein the initial bounding shape is created around the raster-based flood-filled area around the point of interest. In some cases, the vector objects that have bounding shapes that intersect the initial bounding shape are a subset of the plurality of vector objects.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method for flood-filling that comprises:
    creating an initial bounding shape around a point of interest in a vector-based image that includes a plurality of vector objects;
    planarizing a subset of the plurality of vector objects that have bounding shapes that intersect the initial bounding shape, wherein vector objects that have bounding shapes that do not intersect the initial bounding shape are not planarized;
    creating a second bounding shape around a new area resulting from planarizing the subset, wherein the second bounding shape includes the point of interest; and
    performing a vector-based flood-fill on the new area.

2. The method of claim 1, wherein the initial bounding shape is a cell selected from a grid of cells that are projected over the vector-based image.

3. The method of claim 1, wherein:
    the point of interest is within a shape that is defined by a second subset of the vector objects; and
    the initial bounding shape corresponds to the shape that is defined by the second subset of the vector objects.

4. The method of claim 1, further comprising:
    rasterizing an area around the point of interest; and
    creating the initial bounding shape by performing a raster-based flood-fill on the area around the point of interest.

5. The method of claim 1, wherein planarizing the subset further comprises transitively merging the initial bounding shape with a shape that is adjacent to the initial bounding shape in response to determining that the merged shapes share a common visual characteristic.

6. The method of claim 1, wherein the initial bounding shape and the second bounding shape are both rectangular.

7. The method of claim 1, further comprising feeding the subset of the plurality of vector objects into a planar map before planarizing.

8. The method of claim 1, wherein the vector-based flood-fill is performed in response to determining that the second bounding shape does not encompass area that is not included in the initial bounding shape.

9. A non-transitory computer program product comprising program instructions encoded on one or more computer readable media that, when executed by one or more processors, cause a flood-filling process to be carried out, the flood-filling process comprising:
    creating an initial bounding shape around a point of interest in a vector-based image that includes a plurality of vector objects;
    planarizing a subset of the plurality of vector objects that have bounding shapes that intersect the initial bounding shape, wherein vector objects that have bounding shapes that do not intersect the initial bounding shape are not planarized;
    creating a second bounding shape around a new area resulting from planarizing the subset, wherein the second bounding shape includes the point of interest; and
    performing a vector-based flood-fill on the new area.

10. The computer program product of claim 9, wherein:
    the point of interest is within a shape that is defined by a second subset of the vector objects; and
    the initial bounding shape corresponds to the shape that is defined by the second subset of the vector objects.

11. The computer program product of claim 9, wherein the initial bounding shape is a cell selected from a grid of cells that are projected over the vector-based image.

12. The computer program product of claim 9, wherein the flood-filling process further comprises:
    rasterizing an area around the point of interest; and
    creating the initial bounding shape by performing a raster-based flood-fill on the area around the point of interest.

13. The computer program product of claim 9, wherein planarizing the subset further comprises transitively merging the initial bounding shape with a shape that is adjacent to the initial bounding shape in response to determining that the merged shapes share a common visual characteristic.

14. The computer program product of claim 9, wherein the initial bounding shape is selected from a group consisting of a rectangle, a circle, and a convex hull.

15. The computer program product of claim 9, wherein the flood-filling process further comprises feeding the subset of the plurality of vector objects into a planar map before planarizing.

16. The computer program product of claim 9, wherein the vector-based flood-fill is performed in response to determining that the second bounding shape does not encompass area that is not included in the initial bounding shape.

17. A system comprising a memory device and a processor that is operatively coupled to the memory device, wherein the processor is configured to execute instructions stored in the memory device that, when executed, cause the processor to carry out a flood-filling process comprising:
    creating an initial bounding shape around a point of interest in a vector-based image that includes a plurality of vector objects;
    identifying a subset of the vector objects, wherein members of the identified subset have bounding shapes that intersect the initial bounding shape;
    planarizing the identified subset to remove overlapping amongst the vector objects that comprise the identified subset;
    creating a second bounding shape around a new area that results from planarizing the identified subset and that includes the point of interest;
    determining whether the second bounding shape encompasses area that is not included within the initial bounding shape; and
    performing a vector-based flood-fill on the new area.

18. The system of claim 17, wherein planarizing the identified subset further comprises merging adjacent shapes defined by the vector objects that comprise the identified sub set.

19. The system of claim 17, further comprising feeding the identified subset of vector objects into a planar map before planarizing the identified subset.

20. The system of claim 17, wherein the vector-based flood-fill is performed in response to determining that the second bounding shape does not encompass area that is not included in the initial bounding shape.

* * * * *